United States Patent [19]

Stissing

[11] Patent Number: 4,762,084
[45] Date of Patent: Aug. 9, 1988

[54] FISH BREEDING NET

[75] Inventor: Steen Stissing, Stouby, Denmark

[73] Assignee: Stissing Havbrugsartikler APS, Denmark

[21] Appl. No.: 30,828

[22] PCT Filed: Jun. 20, 1986

[86] PCT No.: PCT/DK86/00072
§ 371 Date: Feb. 17, 1987
§ 102(e) Date: Feb. 17, 1987

[87] PCT Pub. No.: WO86/07524
PCT Pub. Date: Dec. 31, 1986

[30] Foreign Application Priority Data

Jun. 21, 1985 [DK] Denmark .................. 2817/85

[51] Int. Cl.⁴ .................................................. A01K 61/00
[52] U.S. Cl. ....................................................... 119/3
[58] Field of Search .................................... 119/2, 3, 4

[56] References Cited

FOREIGN PATENT DOCUMENTS

| 1199539 | 8/1965 | Fed. Rep. of Germany | 119/3 |
| WO85/00726 | 8/1983 | PCT Int'l Appl. | 119/3 |
| 2177884 | 2/1987 | United Kingdom | 119/3 |
| 973087 | 11/1982 | U.S.S.R. | 119/3 |
| 1071284 | 2/1984 | U.S.S.R. | 119/3 |

OTHER PUBLICATIONS

Derwent's Abstract, J6014 D/37, SU 789065.

Primary Examiner—Gene Mancene
Assistant Examiner—Michael Lynch
Attorney, Agent, or Firm—Darby & Darby

[57] ABSTRACT

A fish breeding net (10) for sea fish farms has a bottom (16) which slopes from all sides downwardly toward a net well (17) into which dead fish sooner or later sink or slide. The net well is pulled up to the surface of the water at suitable intervals or as required by means of a line (20) attached to the well and is emptied of dead fish.

5 Claims, 2 Drawing Sheets

FISH BREEDING NET

When breeding fish in large nets which are immersed in the sea, it is important that dead fish are removed as quickly as possible so that they do not spread infection and constitute an environmental danger to the living fish.

When a fish dies, it first sinks slowly to the bottom, but rises after a few days to the surface. The removal, which should preferably take place prior to the rising, has so far been effected by pulling the entire bottom of the net up to the surface of the water where the dead fish are sorted out. The pull-up operation may optionally be performed by means of lines which are attached to the corners of the bottom of the net.

The invention concerns a fish breeding net for sea fish farms, and its object is to provide such a net which permits more rapid and easier removal of dead fish This object is achieved in that the net is constructed as stated in the characterizing portion of claim 1, since, in this structure, the dead fish are concentrated in the very limited area formed by the net well, from which they can be removed without difficulty when the well has been pulled up to the surface.

The handling of the net well can be facilitated considerably in that it has a rigid edge ring, as stated in claim 2.

A particularly expedient embodiment of the net is defined in claim 3.

Figure 1:
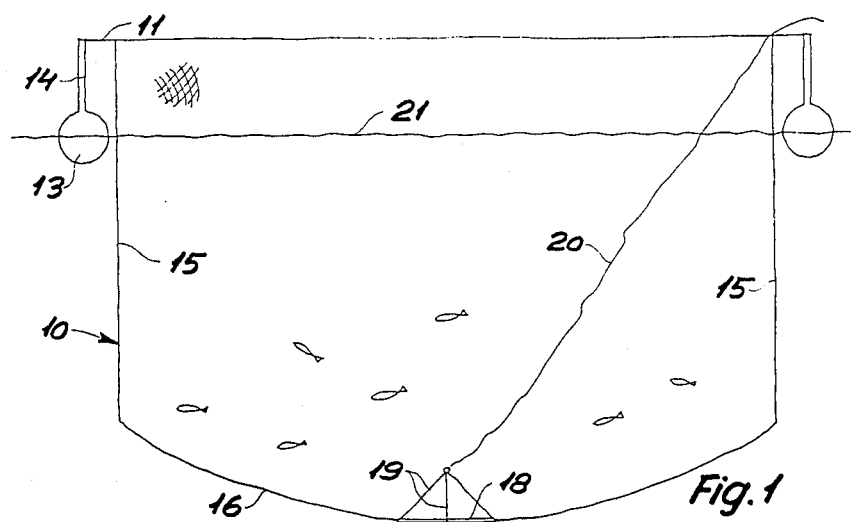
Figure 2:
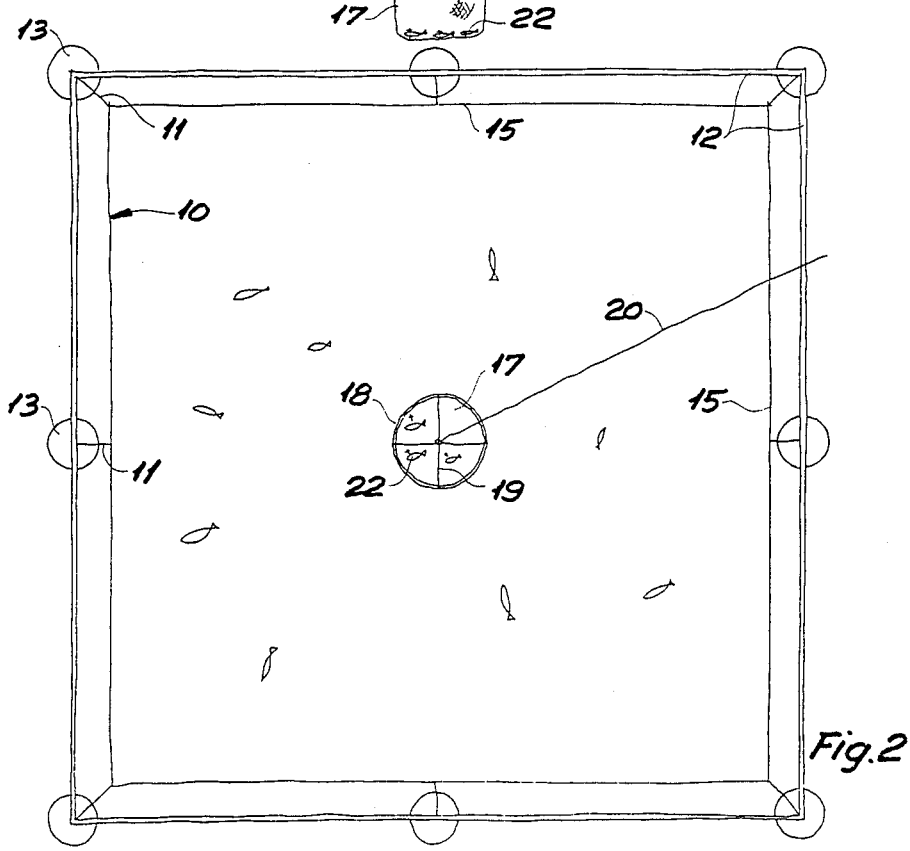
Figure 3:
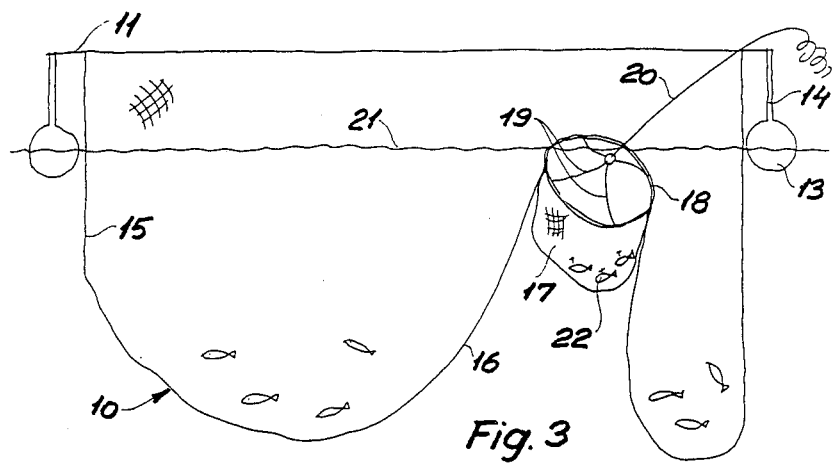

The invention will be explained more fully below with reference to the drawing, in which FIG. 1 is a lateral view of an embodiment of the fish breeding net of the invention immersed in the sea, FIG. 2 shows the same, from above, and FIG. 3 is a lateral view, with the net well pulled up to the surface of the water.

In the drawing, the numeral 10 designates a fish breeding net which is square in horizontal section in the shown embodiment when it is stretched, as shown, by means of lines 11 in a frame 12 of rigid rods supported by a plurality of floats 13 with which it is connected by means of vertical rods 14. The floats 13 are preferably spherical and consist of plastics.

In the stretched state, the net 10 has vertical sides 15 and a bottom 16 which slopes downwardly from the lower edges of these sides toward the centre where the net bottom is so shaped as to form a substantially cylindrical well 17, whose upper edge is stiffened by an edge ring 18 which may e.g. consist of a lead line. This edge ring is connected through a wire cross 19 with a pull-up line 20 by means of which the net well 17 can be pulled up to the water surface 21, as shown in FIG. 3.

Dead fish 22 which sink to the bottom will sooner or later slide down into the well 17 with the assistance of movements in the water, and these fish can easily be removed from the well when it is pulled up to the surface by means of the line 20 at suitable intervals. After the net well has been emptied, the line is released, and the net bottom sinks back to the position shown in FIG. 1.

I claim:
1. A fish breeding net for fish farms comprising:
   a net formed with side surfaces which when the net is deployed slope downwardly to an open origin,
   a net well having an opening at its upper end which is attached to and projects below the open origin of the deployed net surface into which infirm fish enter through the net well opening and accumulate,
   a reinforced edge ring surrounding the net well opening, and
   means connected to said net well edge ring for pulling said net well up to the water surface while leaving active areas of the net below the water surface.
2. A fish breeding net as in claim 1 wherein said pulling means comprises a hoist line which includes a part which extends across said edge ring in a crossed configuration.
3. A fish breeding net as in claim 1 wherein said net has a surface formed of a plurality of substantially planar vertical sides from which each of which extends a bottom portion which slopes downwardly toward the open origin at which said net well is located.
4. A fish breeding net as in claim 3 where said net well is of generally cylindrical shape and said edge ring is generally annular.
5. A fish breeding net as in claim 4 wherein said pulling means comprises a hoist line which includes a part which extends across said edge ring in a crossed configuration.

* * * * *